(12) United States Patent
Brewer et al.

(10) Patent No.: US 7,530,726 B2
(45) Date of Patent: May 12, 2009

(54) LIGHT REDIRECTING FILM HAVING DISCONTINUOUS COATING

(75) Inventors: John C. Brewer, Rochester, NY (US); Charles M. Rankin, Jr., Penfield, NY (US); Robert P. Bourdelais, Pittsford, NY (US); Esther M. Betancourt, Rochester, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 0 days.

(21) Appl. No.: 11/682,335

(22) Filed: Mar. 6, 2007

(65) Prior Publication Data

US 2008/0219028 A1 Sep. 11, 2008

(51) Int. Cl.
*F21V 7/09* (2006.01)
(52) U.S. Cl. .................. 362/627; 362/618; 362/622; 362/624; 362/560; 362/561
(58) Field of Classification Search ............... None
See application file for complete search history.

(56) References Cited

U.S. PATENT DOCUMENTS

| | | | |
|---|---|---|---|
| 5,886,760 A * | 3/1999 | Ueda et al. ................. 349/95 |
| 5,919,551 A * | 7/1999 | Cobb et al. ................. 428/156 |
| 6,077,560 A | 6/2000 | Moshrefzadeh et al. | |
| 6,132,942 A * | 10/2000 | Woodworth et al. ........ 430/496 |
| 6,354,709 B1 | 3/2002 | Campbell et al. | |
| 6,583,936 B1 | 6/2003 | Kaminsky et al. | |
| 6,721,102 B2 | 4/2004 | Bourdelais et al. | |
| 6,906,761 B2 * | 6/2005 | Nakano ..................... 349/65 |
| 7,138,170 B2 * | 11/2006 | Bourdelais et al. .......... 428/188 |
| 2001/0053075 A1 * | 12/2001 | Parker et al. ................. 362/31 |
| 2002/0044351 A1 | 4/2002 | Nilsen | |
| 2004/0012570 A1 | 1/2004 | Cross et al. | |
| 2005/0024754 A1 | 2/2005 | Epstein et al. | |
| 2005/0030630 A1 * | 2/2005 | Ohnishi et al. .............. 359/599 |
| 2005/0047112 A1 | 3/2005 | Chen et al. | |
| 2005/0140860 A1 | 6/2005 | Olczak | |
| 2005/0174646 A1 | 8/2005 | Cowan et al. | |
| 2005/0276949 A1 * | 12/2005 | Bourdelais et al. .......... 428/141 |
| 2006/0092490 A1 * | 5/2006 | McCollum et al. ............ 359/24 |
| 2006/0133109 A1 * | 6/2006 | Kim et al. ................... 362/615 |

FOREIGN PATENT DOCUMENTS

WO 98/50806 5/1997

OTHER PUBLICATIONS

R. P. Bourdelais, et al., "Light Redirecting Film Having Variable Thickness", U.S. Appl. No. 11/682,329, filed Mar. 6, 2007.

* cited by examiner

*Primary Examiner*—Sandra L O'Shea
*Assistant Examiner*—Danielle Allen
(74) *Attorney, Agent, or Firm*—Edwin Oh

(57) ABSTRACT

The invention relates to a display comprising a light source and a light redirecting polymeric film containing a structured surface on at least one side of the film and bearing a discontinuous population of adherent beads bonded to the structured surface.

29 Claims, 8 Drawing Sheets

LIGHT REDIRECTING FILM HAVING DISCONTINUOUS COATING

FIELD OF THE INVENTION

This invention relates to the formation of a light redirecting polymeric film comprising a plurality of surface structures containing a polymeric coating. In particular, a light redirecting film having a wide, uniform light output suitable for directing light energy in LCD display devices.

BACKGROUND OF THE INVENTION

Light redirecting films are typically thin transparent optical films or substrates that redistribute the light passing through the films such that the distribution of the light exiting the films is directed more normal to the surface of the films. Typically, light redirecting films are provided with ordered prismatic grooves, lenticular grooves, or pyramids on the light exit surface of the films which change the angle of the film/air interface for light rays exiting the films and cause the components of the incident light distribution traveling in a plane perpendicular to the refracting surfaces of the grooves to be redistributed in a direction more normal to the surface of the films. Such light redirecting films are used, for example, to improve brightness in liquid crystal displays (LCD), laptop computers, word processors, avionic displays, cell phones, PDAs and the like to make the displays brighter.

Previous light redirecting films suffer from visible Moiré patterns when the light redirecting film is used with a liquid crystal or other display. The surface elements of the light redirecting film interact with other optical films utilized in backlight assemblies, the pattern of printed dots or three-dimensional elements on the back of the light guide plate, or the pixel pattern inside the liquid crystal section of the display to create Moiré, an undesirable effect. Methods known in the art for reducing Moiré have been to die cut the light redirecting films such that the lenticular array is not normal to any side of the sheet. This makes the lenticular array be at an angle relative to another light redirecting film or to the display electronics. Methods also used include randomizing the linear array by widths of the linear array elements, to vary the height along the linear array periodically, to add a diffusing layer on the opposite side of the linear array on the film, or to round the ridges of the linear array. The above techniques to reduce Moiré also cause a decrease in on-axis brightness or do not work to adequately solve the Moiré problem. Moiré and on-axis brightness tend to be related, meaning that a film with high on-axis gain would have high Moiré in a system. It would be beneficial to be able to reduce the Moiré while maintaining sufficient on-axis gain.

In addition, there are relatively few numbers of light redirecting films compared with the numbers of liquid crystal display configurations. Each display configuration was selected to fill a desired output. The amount of on-axis gain, viewing angle, Moiré reduction, and total light output were all tailored by combining different films in different configurations. The light redirecting film used in the systems is limited because there are only a few different light redirecting surface textures available. It would be desirable to have a light redirecting film that was customizable to the desired output of the display device.

Typical light directing films provide high on-axis illumination at the expense of illumination at angles between 40 and 90 degrees from the normal. These high, on-axis light directing films are useful for portable display devices such as laptop computers and games were a high on-axis brightness lessens the power consumption for batteries and provides for some level of viewing privacy. For some TV and monitor applications that are intended for public viewing, high brightness over a wide range of viewing angles allows for consistent viewing of images and video. It would be desirable to have a light directing film that could provide high brightness over a wide range of viewing angles.

U.S. Pat. No. 5,919,551 (Cobb, Jr. et al) claims a linear array film with variable pitch peaks and/or grooves to reduce the visibility of Moiré interference patterns. The pitch variations can be over groups of adjacent peaks and/or valleys or between adjacent pairs of peaks and/or valleys. While this varying of the pitch of the linear array elements does reduce Moiré, the linear elements of the film still interact with the dot pattern on the backlight light guide and the electronics inside the liquid crystal section of the display.

U.S. Pat. No. 6,354,709 discloses a film with a linear array that varies in height along its ridgeline and the ridgeline also moves side to side. While the film does redirect light and its varying height along the ridgeline slightly reduces Moiré, it would be desirable to have a film that significantly reduces the Moiré of the film when used in a system while maintaining a relatively high on-axis gain.

US Application 2001/0053075 (Parker et al.) discloses the use of individual surface structures for the redirecting of light to create high on-axis gain in a LCD device.

U.S. Pat. No. 6,721,102 (Bourdelais et al.) disclose a visible light diffuser formed with complex polymer lenses. The complex polymer lenses disclosed in U.S. Pat. No. 6,721,102 are created by adding micrometer sized polymer lenses on the surface of low aspect ratio polymer base lenses. The ratio of smaller lenses to large lenses is between 2:1 to 30:1. The diffuser disclosed in U.S. Pat. No. 6,721,102 is useful for diffusing light sources, in particular, LCD backlight sources.

U.S. Pat. No. 6,583,936 (Kaminsky et al) discloses a patterned roller for the micro-replication of light polymer diffusion lenses. The patterned roller is created by first bead blasting the roller with multiple sized particles, followed by a chroming process that creates micro-nodules. The manufacturing method for the roller is well suited for light diffusion lenses that are intended to diffuse incident light energy.

US Application 2005/00247554 (Epstein et al.) discloses surface structures that are coated with a matrix polymer contain polymer beads preferably having a diameter of between 2 and 5 micrometers to create random scattering.

US Application 2005/0047112 (Chen et al.) discloses a light guide plate with prisms formed on the surface of the light guide plate. The surface of the prisms contains a coated inorganic nano-particle layer consisting of titanium dioxide, silicone dioxide or aluminum oxide to scatter transmitted light.

US Application 2005/0140860 (Olczak) discloses an optical film defined by a first surface structure function modulated by a second surface structure such that the first surface acts to diffuse light incident on the film and the second surface also functions to diffuse incident light.

US Application 2005/0174646 (Cowan et al.) discloses a reflective diffuser, which transmits or reflects incident light into a specific range of angles.

U.S. Application 2002/0044351 (Nilsen) discloses a polarizer comprising sub-wavelength microstructures that are partially covered with a light transmissive inhibiting surface for polarizing light. The inhibiting surface can also comprise a reflective surface such as a metallized coating.

U.S. Pat. No. 6,077,560 (Moshrefzadeh et al) discloses a method of selectively printing a structured substrate without the use of a mask. The method includes coating the structured surface with a filler material such that the structured surface is covered.

U.S. Patent Application 2004/0012570 (Cross et al) discloses a resistive touch screen comprising a microstructured surface that is uniformly coated with an electrically conductive layer.

WO 98/50806 discloses a brightness enhancement article comprising a rounded prism structure and light scattering protrusions to increase the optical gain of incident light. It has been found that the scattering protrusions described in WO 98/50806 tends to result in unwanted abrasion of adjacent surfaces and the rounded prism tend to scratch resulting in unwanted cosmetic defects.

PROBLEM TO BE SOLVED BY THE INVENTION

There is a need to provide a light redirecting film that provides high brightness over a wide range of viewing angles. Further, there is a need to provide protection to the precision light redirecting elements located on the surface of the light redirecting film.

SUMMARY OF THE INVENTION

The invention provides a display comprising a light source and a light redirecting polymeric film containing a structured surface on at least one side of the film and bearing a discontinuous population of adherent beads bonded to the structured surface.

ADVANTAGEOUS EFFECT OF THE INVENTION

The invention provides an optical device comprising a light redirecting film having high brightness over a wide range of viewing angles while protecting the precision light redirecting elements.

BRIEF DESCRIPTION OF THE DRAWINGS

The invention is best understood from the following detailed description when read with the accompanying drawing figures. It is emphasized that the various features are not necessarily drawn to scale.

DETAILED DESCRIPTION OF THE INVENTION

Figure 1:
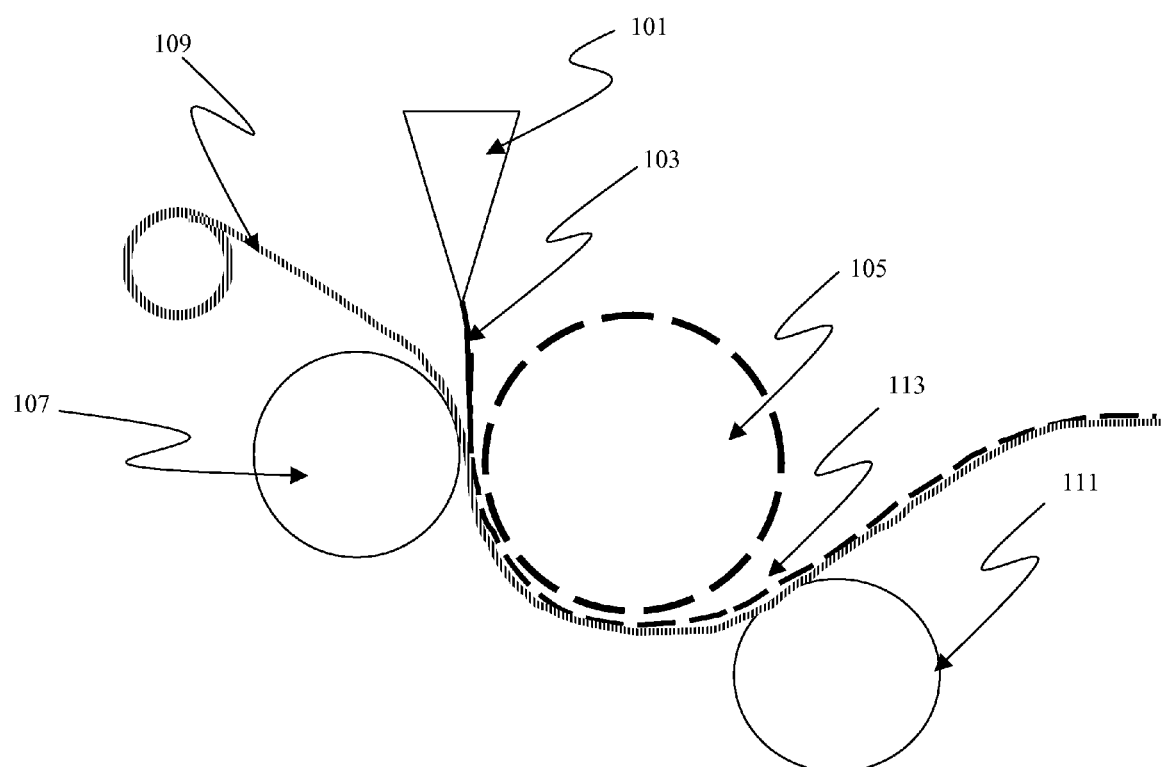
FIG. 1 is a simplified schematic diagram of an apparatus for fabricating optical films in accordance with an example embodiment.

The invention has numerous advantages compared to current light redirecting films. The invention provides high levels of brightness over a wide range of viewing angles. This combination of high brightness and wide viewing angles is well suited for the LCD TV and monitor market. High brightness allows for efficient utilization of LCD backlight energy and wide viewing angles ensure even, uniform brightness of the LCD image over a wide range of viewing angles typical of monitors and TV applications. Further, the film provides a softer angular cut-off compared to prior art light directing films. Prior art light directing films have a hard angular cut-off causing illumination to change dramatically over a few degrees. While this hard angular cut-off is acceptable or even preferred for personal viewing devices such as laptop computers, hard angular cut-off can cause a reduction in image quality for LCD devices that are viewed over larger angles such as TV and public view monitors.

The adherent beads applied to the surface of the surface structures allow more incident light to pass through the light redirecting film compared to prior art light redirecting films. It has been found that the adherent beads applied to the surface of the surface structures "frustrates" or reduces the amount of total internal reflection in the light redirecting film. The frustration of the total internal reflection of the light redirecting film results in between 5 and 14% higher light output compared to the same light redirecting film without the polymeric coating.

The film's individual surface structures' and placement on the film balances the tradeoff between Moiré reduction and on-axis gain producing relatively high on-axis gain while significantly reducing Moiré. Moiré patterns result when two or more regular sets of lines or points overlap. It results in a pattern of repeating lines or shapes, the line size and frequency depending on the two patterns interacting. In a display device such as an LCD display, Moiré patterns that can be observed by the viewer of the LCD device are objectionable as they interfere with the quality of the displayed information or image. The light redirecting film of the invention reduces Moiré compared to prior art light redirecting films while maintaining the amount of on-axis gain. The size and shape distributions of the individual elements and polymeric coating can be customized for each display or viewing application.

Furthermore, the light redirecting film of the invention can be customized to the light source and light output of the diffuser plate or light guide plate, in order to more efficiently redirect the light. The individual surface structures make the film very flexible in design parameters, allowing different individual surface structures of different size, shape or orientation to be used throughout the film surface to process the light entering the film the most efficiently. For example, if the light output as a function of angle was known for all points on the light guide plate, a light redirecting film using individual surface structures having different shapes, sizes, or orientation could be designed to efficiently process the light exiting the light guide plate.

Newton rings occur when two reflective surfaces (for example light redirecting films or other optical films in a liquid crystal display) are close enough to each other that the distance starts to approximate the wavelength of light. Photons reflect between the two surfaces as well as passing through them, creating interference effects. Newton rings are undesirable to a viewer through a liquid crystal display. The film of the invention reduces Newton rings by having a percentage of the individual elements extend above other elements on the light redirecting film.

The film of the invention has a larger effective pitch with multiple sized elements than a light redirecting film with only one sized element. Having a larger effective pitch means that film will have higher on-axis gain than the more overlapped film with the same size land, or manufacturing tolerances could be lessened such that the land could become larger to have the same on-axis performance as the more overlapped film. Lessening the manufacturing tolerances could increase productivity of manufacturing the film.

The invention utilizes polymers for the adherent beads that resist scratching and abrasion and have been shown to be mechanically tougher compared to other prior art delicate light redirecting films constructed from UV cured polyacrylate. The invention uses a polymer coating to both modify the optical output of a redirecting surface structure and to provide protection to the underlying surface structure avoiding the need for expensive and problematic pressure sensitive based cover sheets.

The invention utilizes a combination of coating technology and polymer formulation to provide a robust optical output signal. As both the coating process and polymer materials experience natural, statistically normal variability, the variability of the output optical signal of the invention is small in comparison. This allows the invention materials to be more easily manufactured compared to the difficult process of controlling the many process variables associated with precision polymer light re-directing lenses. Additionally, the lower optical output signal variability results in a high quality, precise display device that is consistent with high definition TV signals, blue ray input or gaming graphics.

Embodiments of the invention may also provide low coefficient of friction surface, reduced dielectric constant, abrasion resistance, increased stiffness, lower scattering, improved Moiré, higher light output, improved mechanical toughness and improved coloration. These and other advantages will be apparent from the detailed description below.

As used herein, "transparent" means the ability to pass radiation without significant deviation or absorption. For this invention, "transparent" material is defined as a material that has a spectral transmission greater than 90%. The term "light" means visible light. The term "polymeric film" means a film comprising polymers. The term "polymer" means homopolymers, block co-polymers, co-polymers and polymer blends. As used herein, the term microbead means a bead that is circular to elliptical in cross-section that has a diameter or major axis of from 0.1 to 30 micrometers.

Individual surface structures, in the context of an optical film, mean elements of a well-defined shape that can be projections or depressions in the optical film. Individual surface structures are small relative to the length and width of an optical film. The term "curved surface" is used to indicate a three dimensional element on a film that has curvature in at least one plane. "Wedge shaped elements" is used to indicate an element that includes one or more sloping surfaces, and these surfaces may be combination of planar and curved surfaces. The term "surface structures" is used to indicate a well-defined, purposeful structure present on the surface on a polymer film. "Surface structures" have a measurable size and are used to modify light energy entering and/or exiting the surface of a polymer film. The term "light entry surface" is used to indicate the surface of an optical film that light energy enters. In a liquid crystal display device, the light entry surface is the side facing the illumination light source. The term "light exit surface" is used to indicate the surface of the optical film that light exits. In a liquid crystal display device, the light exit surface is the side facing the liquid crystal cells. "On-axis optical gain loss" means, the reduction in optical gain observed relative to a given reference material. When expressed as a fraction, it is the optical gain for the sample of interest divided by the reference material optical gain. When expressed as a percentage, it is the percentage loss of optical gain relative to the reference material. "Redirecting" is defined as an optical property of an optical film to change the direction on incident light energy.

The term "optical film" is used to indicate a thin polymer film that changes the nature of transmitted incident light. For example, a redirecting optical film provides an optical gain (output/input) greater than 1.0. The Optical Gain (OG) of a light management material is defined as the luminance of the light management material divided by the reference input luminance. Given that light distributions are rarely isotropic, this ratio is typically computed for specific angular coordinates (theta and phi). It is customary in the art to represent a subset of these ratios by plotting two cross-sectional graphs: one at phi=0 and the other at phi=90, while theta varies continuously from −80 to +80 degrees. "On-axis gain" is defined as output light intensity perpendicular to the film plane, divided by input light intensity. "Redirecting" is defined as an optical property of an optical film to change the direction of incident light energy.

The term roughness average or $R_a$ means the average peak to valley height between the beads in the polymeric coating and is measured in by a profilometer and the result is expressed in micrometers. The term $R_a$ is used to characterize the average roughness of a given area or on the surface area of an optical element.

The term optical films means surface structures on the surface of a substrate that have a positive profile. The surface structures are elements that perform a designated optical function such as redirection or diffusion or turning of incident light. The term light redirecting film means a thin film than perform the function of redirecting incident light into a desired output. Redirection can be either spicular or diffuse. Examples of redirecting films include, but are not limited to turning films, diffusion films and retro-reflective films. The term adherent beads mean polymer beads that are adhered to the surface area of the surface structures. The adherent beads are irregular in shape. The term discontinuous population means that space, in the plane of the surface structures, exists between the adherent beads. The space between the adherent beads is irregular in shape and varies in size and location. A group of adherent beads clumps together to form a population of adherent beads and that population is separated other populations by an area that is substantially free of adherent beads.

In order to provide a display having high brightness and a wide angular viewing such as a LCD TV or a LCD monitor, a display comprising a light source and a light redirecting polymeric film containing a structured surface on at least one side of the film and bearing a discontinuous population of adherent beads bonded to the structured surface is preferred. By combining a display with a light redirecting film containing a structured surface bearing discontinuous population of adherent beads bonded to the structured surface, the optical film both increases the on axis brightness of backlight sources while providing a wide viewing angle. Prior art light redirecting film provide high on axis brightness, but have a very limited viewing angle that is not suitable for public view displays such as LCD TV or LCD monitors used to display public information such as airline departure times, point of sale information or information at sporting events. The structured surface of the invention provides a means to collimate light while the discontinuous population of adherent beads provides a means to diffuse the collimated light into a wide viewing angle. By combining these two fore mentioned functions, the optical film of the invention provides high on-axis brightness and a wide viewing angle to display systems. In addition, it has been found that the polymer coating provides an important level of protection to the underlying surface structure, providing a more robust, scratch and abrasion surface compared to optical structures that do not have polymer coatings.

On-axis brightness and luminance angles are important determining factors in the contrast ratio of current LCD TV modalities and the viewing quality of LCD TV. While increasing on-axis brightness has been shown to improve contrast ratio, angular brightness cut-off is hard. The invention provides a unique combination of high on-axis brightness while providing a soft angular cut-off and a much-improved angular distribution of light that provides excellent image quality to public display devices such as LCD monitors and TV.

For media displays, especially those intended for group viewing such as television, it is important to have sufficient luminance at off-axis viewing locations as well as optimum on-axis luminance. Contemporary LCD TV's typically have an on-axis peak luminance between 400-600 nits (candelas/$m^2$), although the current TC06 standard states they may as low as 300 nits (50% of the brightest sets). Given this information, it is preferable that the invention has an on-axis gain reduction of no more than 20%, or equivocally, have an on-axis gain value that is at least 80% of the reference material (uncoated prismatic or light redirecting film).

While many metrics such as contrast ratio are quoted out to 90 degrees off-axis, recent studies have shown that so far as image quality is concerned, 60 degrees off-axis in the horizontal scan direction is a more relevant limit for display viewing. Vertical viewing angle extent is less important than horizontal viewing extent as a consequence of display viewing habits. Given an on-axis gain reduction of not more than 20%, a corresponding off-axis gain improvement, of at least 30%, (or equivocally 130% of the reference material value) is desirable at 60 degree in the horizontal scan direction. An improvement in the vertical scan direction, at 40 degrees, is similarly desirable.

Additionally, it is preferable that rapid changes in luminance be avoided so the viewing experience is not drastically altered with small changes in viewing position; particularly in the horizontal scan direction. Therefore, the first derivative of the gain curve preferably should not exceed 0.06 cd/$m^2$/degree in the horizontal scan direction, out to a maximum angle of 60 degrees. Preferably, the first derivative of the gain curve should not exceed 0.08 cd/$m^2$/degree in the vertical scan direction, out to a maximum angle of 40 degrees.

Figure 5:
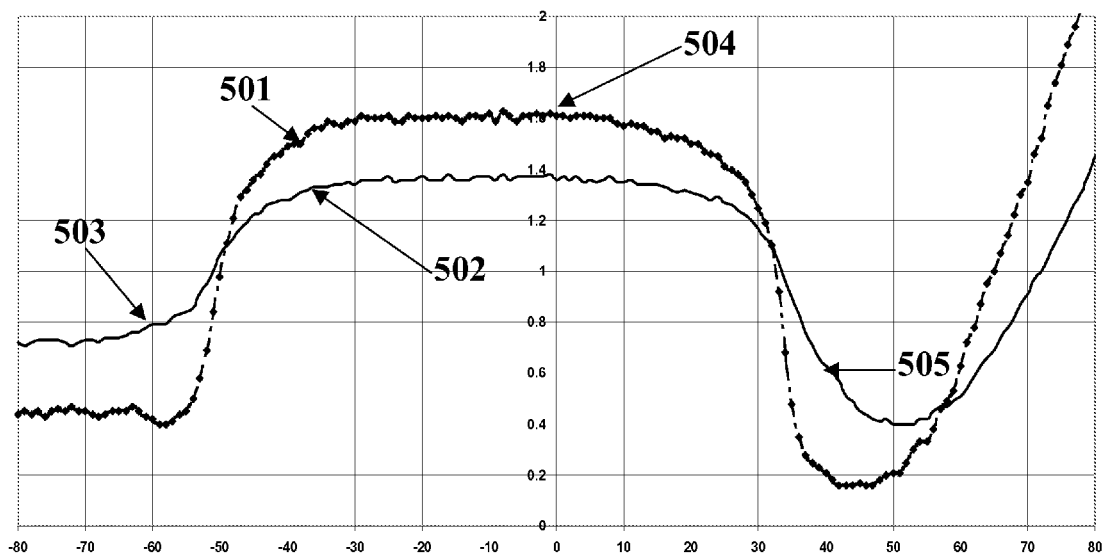
FIG. 5 is a graph of optical gain vs. viewing angle for inventive and comparative materials.

FIG. 5, Curve 501, shows the optical gain vs. viewing angle relationship for a collimating film (prismatic structure) currently used in the LCD industry. Curve 502 is an example representative of the invention. Curves for the horizontal scan direction (−80<theta<80, phi=0) and vertical scan direction ((−80<theta<80, phi=90) of this type of optical film are typically symmetric about the center point (theta=0, phi=0, 90). So as to limit the amount of redundant information, the convention used in optical gain curves such as those in FIG. 5 is that −80 to 0 degrees on the x-axis represents horizontal scan information; 0 to 80 degrees on the x-axis represents vertical scan information.

Curve 501 has the characteristic high on-axis gain desirable for applications where on-axis viewing is the dominant observer mode but suffers from very steep (high first derivative values) luminance gain fall off both in the horizontal and vertical scan directions. It has undesirably low off-axis gain values at +/−60 degrees in the horizontal scan direction and +/−40 degrees in the vertical scan direction. An example of the invention, curve 502, has a lower on-axis gain position, but decreases much more slowly moving off-axis (low first derivative values), and has improved off-axis gain values at +/−60 degrees in the horizontal scan direction and +/−40 degrees in the vertical scan direction. Such properties are advantageous for media displays intended for group viewing, such as television.

Figure 6:
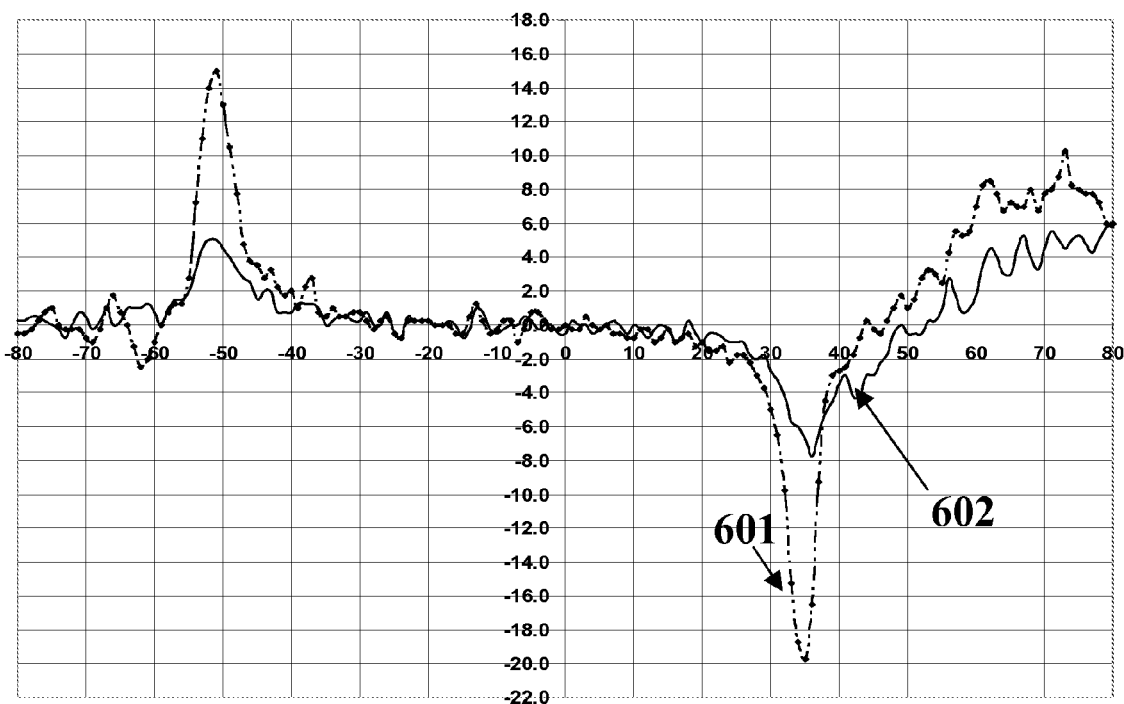
FIG. 6 is a graph of the first derivative of vs. viewing angle for the curves contained in FIG. 5.

The first derivative of the curves 501 and 502 are curves 601 and 602 respectively, shown in FIG. 6, using the same x-axis convention as described for FIG. 5. FIG. 6 demonstrates that the invention has luminance gain changes that very much more slowly with viewing angle, both horizontally (+/−60 degrees) and vertically (+/−40), than the typical prismatic collimating film.

The preferred properties of the optical gain vs. viewing angle curves can be represented by parameters as outlined below:

1) So as to minimize the loss of image quality on-axis, optical gains relative to the uncoated reference film is preferably at least 80%. (Point 504, FIG. 5).
2) So as to significantly improve off-axis luminance, the off-axis gain improvement at 60 degrees in the horizontal scan direction and 40 degrees in the vertical direction is preferably at least 130% of the reference film (Point 503 and point 505 respectively).
3) So as to minimize the perceived luminance loss as a result of small changes in angular position, the change in luminance gain as a function of angle (the absolute value of the first derivative) is preferably no more than 0.06 cd/$m^2$/degree and 0.08 cd/$m^2$/degree in the horizontal and vertical scan directions respectively, out to angles +/−60 degrees off axis in the horizontal scan direction and +/−40 degrees in the vertical scan direction.

It has been shown that adherent beads provide the preferred optical characteristics of a wide viewing angle film suitable for LCD TV. In a preferred embodiment of the invention, the adherent beads have a height of between 0.70 and 5.0 micrometers. Beads heights less than 0.50 micrometers have been found to have a small effect in increasing the viewing angle for LCD TV. Bead heights greater 6.0 have been found to diffuse too much of the collimated light, reducing the contrast ratio of present day LCD modes such as IPS (In Plane Switching) and VA (Vertical alignment).

In another preferred embodiment of the invention the discontinuous population of adherent beads exhibits variable thickness over the surface of the structured surface. More preferably, the discontinuous population of adherent beads exhibits a variable thickness over the structured surface wherein the thickness of the adherent beads is greater on the sloping sides of the structured surface compared to the peak areas of the structured surface. Variable thickness provides a means to efficiently diffuse the light energy from the surface structures. A more uniform coating would have a smaller impact on the viewing angle compared to variable thickness. By locating more of the discontinuous population of adherent beads on the sloping sides of the surface structure, the adherent beads are protected from handling damage and vibration damage with a display during shipment and consumer use.

In a preferred embodiment of the invention, the structured surface comprises polycarbonate and the adherent beads comprise polyurethane. Polyurethane coated onto the surface of the structure surface surprisingly forms a discontinuous coating of adherent beads without the need for expensive polymer microbeads common to discontinuous coatings. The polyurethane applied to the surface of the polycarbonate surface structure "agglomerates" or "form bead like structures" on the surface of the polycarbonate providing a similar profile to polymer microbeads coated in a matrix. The polyurethane polymer adheres well to the surface of polycarbonate surface structures and is suitable for use in display systems such as LCD TV.

Other preferred polymers for the adherent beads are polymers that can be coated onto surface structures and form bead like structures. Further, preferred polymer are one that have a % transparency greater than 80%, have a relatively low dielectric constant, and adhere well to the surface structures. Other preferred polymers include PVP, polyester and acrylic.

In a further embodiment of the invention, the discontinuous population of adherent beads is in the form of a pattern. A pattern-wise discontinuous population of adherent beads provides a means to optically distinguish areas of the polymer from each other. Examples of desirable patterns include gradients for altering the optical output of the film across the film diagonal, width or length, spot patterns that are aligned with LCD pixels, or sufficient small patterns to frustrate Moiré patterns or reduce film wet-out. Patterning-wise coating preferably can be applied to the surface of the optical film using direct gravure, in-direct gravure or ink jet coating techniques.

In another preferred embodiment, the polymeric coating is present on the surface structure in a pattern. By patterning the variable polymeric coating on the surface of a surface structure, the output of each individual surface structure allowing for very small or fine adjustment of the optical modification. Examples of desirable patterns include stripes, dots and wiggled lines.

In another preferred embodiment of the invention, the adherent beads are irregular in shape. It has been found that irregular shaped adherent beads are efficient at increasing both the horizontal and vertical viewing angle of the display. The adjectives horizontal and vertical, when used in conjunction with displays and display measurements, are relative to the intended display-observer pairing. Further irregular shaped adherent beads sufficiently diffuse light energy hiding small cosmetic defects in the polymer film, thereby increasing the quality of the polymer film. The irregular shape may be in a length, width or height dimension. The irregular shape may vary in one or more dimensions. The shape of the adherent beads can differ from beads to bead on the surface structure or between populations of beads located at different point on the polymer film.

In a preferred embodiment of the invention, the polymer film preferably has surface structure on both sides of the polymer film. Surface structure present on both sides provides an additional opportunity to modify the input light energy for the purposes of improving the efficiency of display devices. Additionally, a polymer film having a surface structure on both sides of the polymer film has been shown to provide a reduction in undesirable film-to-film wet-out reducing abrasion and Newton rings. Examples of surface structure pairs include a diffuser structure on one side opposed by a light redirecting feature or a light turning feature opposed by a light diffusing structure.

Figure 2:
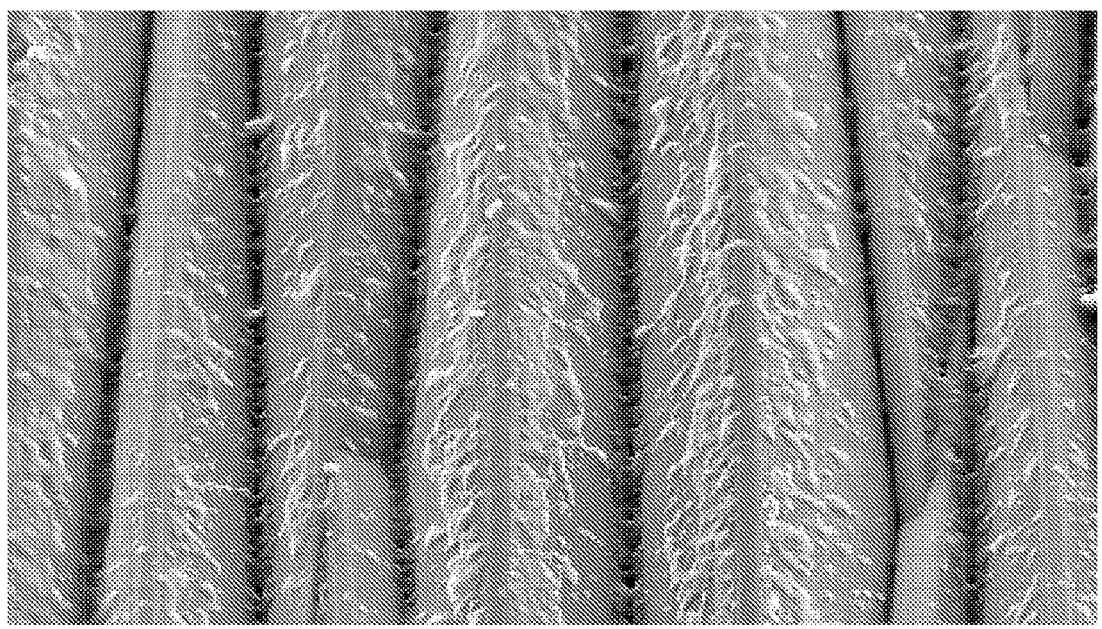
FIG. 2 is a magnified top schematic view of a microstructure in accordance with an example embodiment.

FIG. 2 shows a magnified top schematic view of a preferred microstructure bearing a discontinuous population of adherent beads bonded to the underlying structured surface. The adherent beads are present along the side of the underlying surface structure, are discontinuous and have the desired surface profile to provide the preferred optical output.

Figure 3:
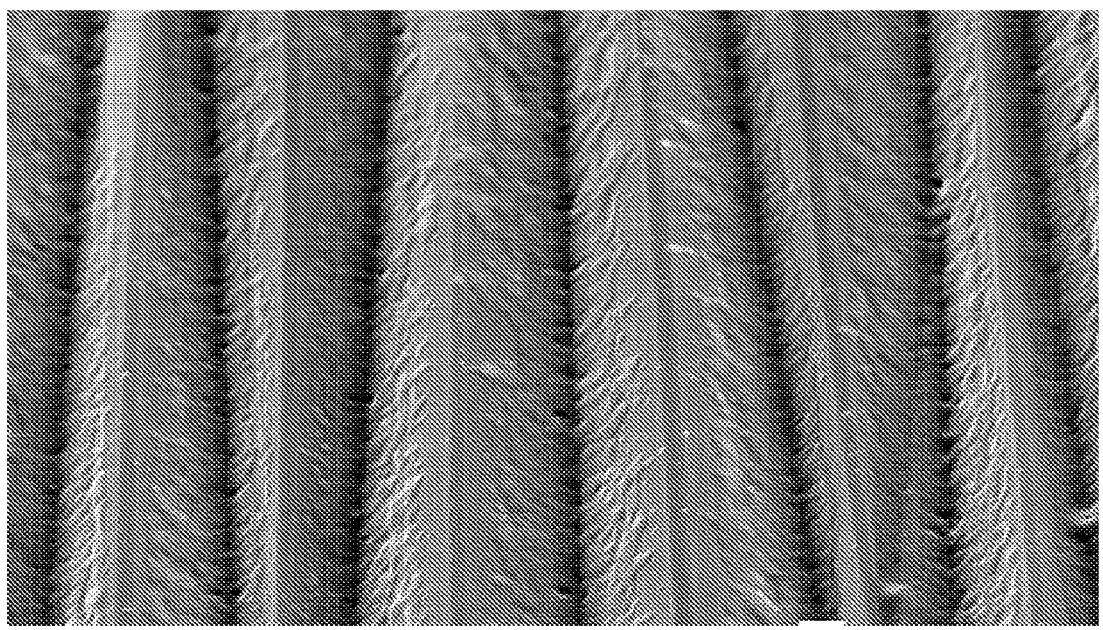
FIG. 3 is a magnified top schematic view of a microstructure in accordance with an example embodiment.

FIG. 3 shows a magnified top schematic view of a preferred microstructure bearing a discontinuous population of adherent beads bonded to the underlying structured surface. The adherent beads are present along the side of the underlying surface structure, are discontinuous and have the desired surface profile to provide the preferred optical output. The adherent beads in FIG. 3 are more rounded compared to the beads in FIG. 2 and the adherent beads in FIG. 3 are more concentrated in the valley areas compared to the distributions of beads in FIG. 2.

Figure 4:
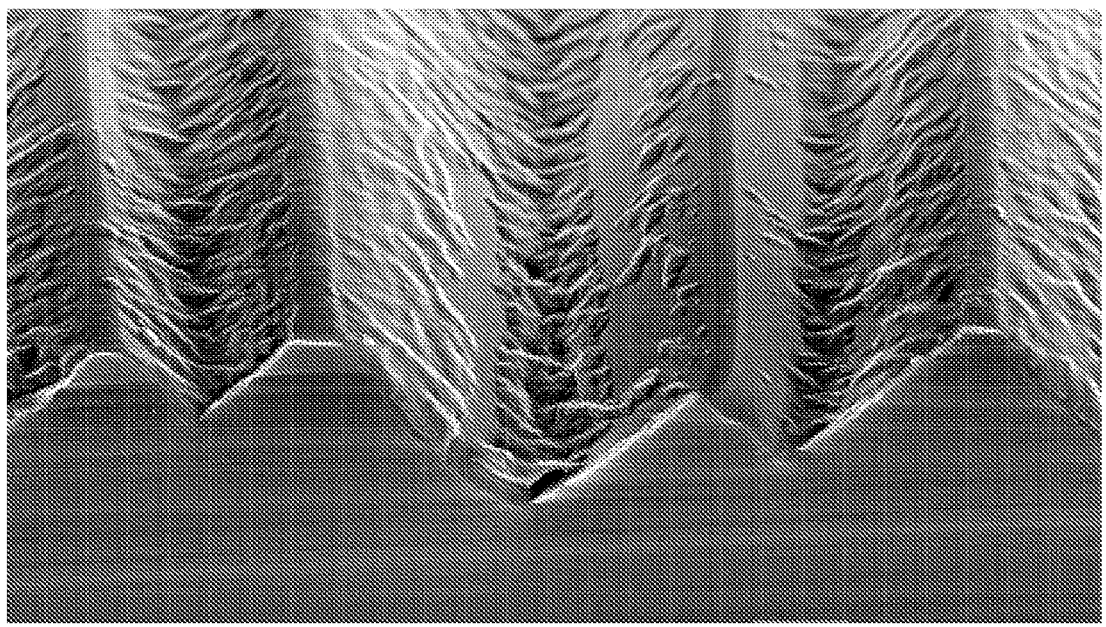
FIG. 4 is a magnified top schematic view of a microstructure in accordance with an example embodiment.

FIG. 4 shows a magnified top schematic view of a preferred microstructure bearing a discontinuous population of adherent beads bonded to the underlying structured surface. The adherent beads are present along the side of the underlying surface structure and in the valley areas, are discontinuous and have the desired surface profile to provide the preferred optical output. The adherent beads are present in sufficient quantities on both the sides of the underlying structures as well as the valley areas between the underlying structures.

Figure 7:
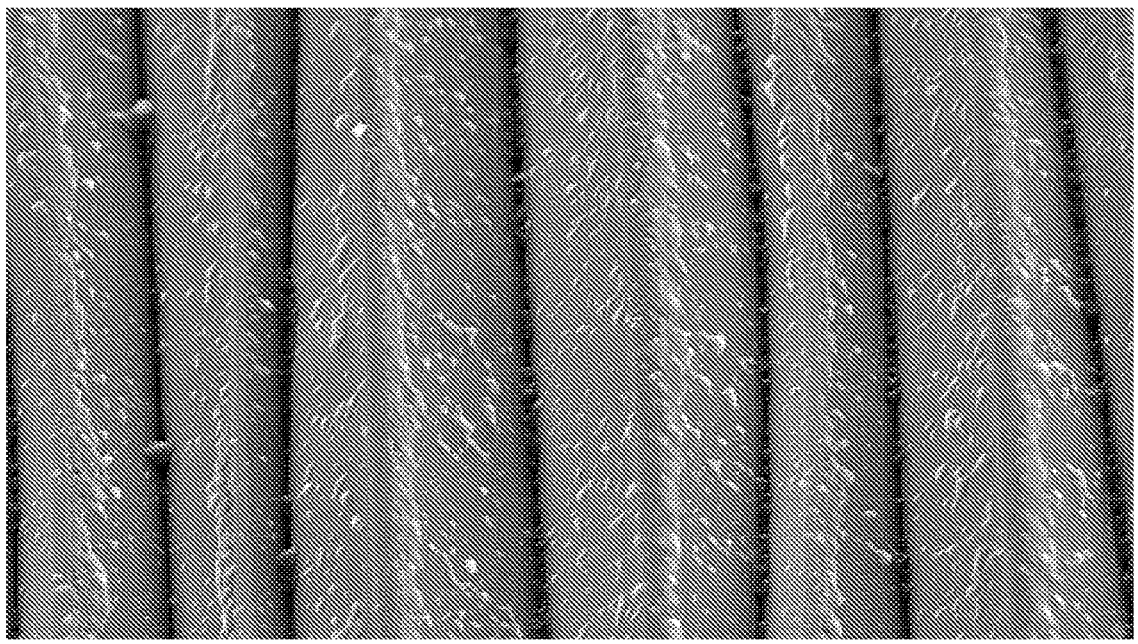
FIG. 7 is a magnified top schematic view of a coated microstructure.

FIG. 7 shows a magnified top schematic view of a coated underlying microstructure. The adherent beads in FIG. 7 are not present in sufficient quantity to provide the desired optical properties. While on the on-axis gain for the coated structure in FIG. 7 is sufficiently high, the maximum first derivative value is unsatisfactory.

Figure 8:
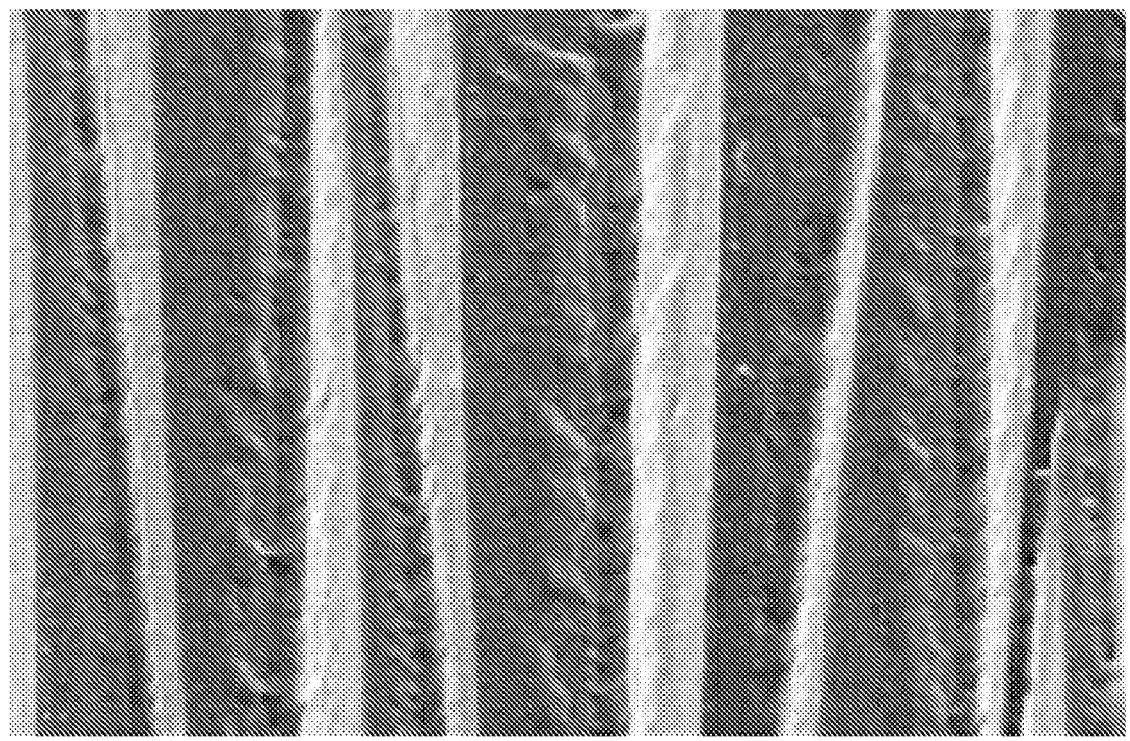
FIG. 8 is a magnified top schematic view of a coated microstructure.

FIG. 8 shows a magnified top schematic view of a coated underlying microstructure. The coating in FIG. 8 does not have sufficient roughness and the coating is not sufficiently discontinuous to provide the desired optical performance.

In a preferred embodiment, the variable thickness has a range of at least 50% of the maximum thickness. For example, if the maximum thickness is 4.0 micrometers, then the variable thickness preferably will have a range of at least 2.0 micrometers. It has been shown that by covering light redirecting surface structures with a variable thickness layer the incident light energy is redirected over a wider angle compared to the same redirecting macrostructure without the variable polymer coating. Further, the angular brightness cut-off is softer and less abrupt compared to the same redirecting macrostructure without the variable polymer coating. In addition, the variable polymer coating has been shown to hide small cosmetic defects in the optical film, provide a reduction in Moiré compared to light redirecting surface structures without variable polymer coating which better obscures the backlight pattern from the viewer eye compared to light redirecting surface structures without variable polymer coating.

In another preferred embodiment, the adherent irregular shaped polymer beads further comprise polymers beads having an index of refraction difference between the polymer coating and the polymer beads of between 0.02 and 0.50. By providing small beads on the sides of the surface structures, the beads contained in a binder matrix reduce the slope of the angular luminance curve without unwanted scatter. Further, by providing both irregular shaped adherent beads and elliptical or spherical shaped beads, the polymer beads can provide a level of protection to the adherent beads and provide optical stand-off between the polymeric film and other surfaces located in the display avoiding interfacial problems from occurring between the adherent beads and other surfaces located in the display. In a preferred embodiment, the microbeads comprise polymers. Polymer beads tend to be less expensive than inorganic beads, typically have high light transmission and have been shown to adhere well to the surface structures with polymer binders such as polyurethane. Preferred bead materials include but not limited to polystyrene, PMMA, methyl methacrylate and ethyleneglycol dimethacrylate.

In a preferred embodiment, the micro beads are substantially circular. Circular micro beads have been found to provide excellent diffusion of incident light, can be easily coated and do not have sharp angular profiles that could result in abrasion of other adjacent optical components. In another preferred embodiment, the micro-beads are elliptical. Elliptical microbeads have been shown to orient during coating and orient to the direction of some surface structures. Elliptical beads have also been shown to provide light output that can favor the major axis of the elliptical beads allowing for independent control of vertical and horizontal brightness.

In another embodiment of the invention, the adherent beads preferably covers between 10 and 80% of the structured surface area. By partially covering the surface of the surface structures, a compromise position between light redirection and view angle can be obtained. By covering only a portion of the surface structures, light-redirecting geometry can be mostly preserved, while providing an improved viewing angle. An example is adherent beads that exist primarily on the sloping sides of adjacent surface features. The apex angle area of the feature can be preserved for light redirecting while the coated sloping sides can modify exit light to provide a wider viewing angle.

In one embodiment of the invention, the surface structures are preferably structures having a length, diameter or other major dimension of at least 25 micrometers that collimate incident light energy. In one embodiment of the invention, the macrostructure preferably comprises a prism. Prism structures have been shown to be efficient collimators of light and generally have two sloping surfaces. Light collimation generally is maximized when the included angle of the prism is between 88 and 92 degrees. In another preferred embodiment of the invention, the surface structures comprise individual surface structures having a ridgeline. Individual surface structures have been shown to reduce Moiré and improve brightness uniformity compared to regular prismatic structures.

The depths of the surface structures are preferably between 10 and 50 micrometers. The depth of the curved surface structures is measured from the ridge of the curved surface structures to the base of the curved surface structures. A surface structure depth less than 8 micrometers results in a light redirecting film with low on-axis brightness. A depth greater than 55 micrometers is difficult to manufacture and contains features large enough to create a Moiré pattern.

In a preferred embodiment, the surface structures preferably have a width of between 20 and 100 micrometers. When the surface structures have a width of greater than 130 micrometers, they become large enough that the viewer can see them through the liquid crystal display, detracting from the quality of the display. When the surface structures have a width of less than 12 micrometers, the width of the ridgeline of the feature takes up a larger portion of the width of the feature. This ridgeline is typically flattened and does not have the same light shaping characteristics of the rest of the surface structures. This increase in amount of width of the ridgeline to the width of the surface structures decreases the performance of the optical film. More preferably, the curved surface structures have a width of between 15 and 60 micrometers. It has been shown that this range provides good light shaping characteristics and cannot be seen by the viewer through a display. The specific width used in a display device design will depend, in part, on the pixel pitch of the liquid crystal display. The element width should be chosen to help minimize undesirable Moiré interference.

The length of the surface structures as measured along the protruding ridge is preferably between 800 and 3000 micrometers. As the long dimension lengthens the pattern becomes one-dimensional and a Moiré pattern can develop. As the pattern is shortened the screen gain is reduced and therefore is not of interest. This range of length of the curved surface structures has been found to reduce unwanted Moiré patterns and simultaneously provide high on-axis brightness.

In another preferred embodiment, the surface structures as measured along the protruding ridge is preferably between 100 and 600 micrometers. As the long dimension of the surface structures is reduced, the tendency to form Moiré patterns is also reduced. This range of surface structures length has been shown to significantly reduce unwanted Moiré patterns encountered in display devices while providing on-axis brightness.

The surface structures of the invention are preferably overlapping. By overlapping the curved surface structures, Moiré beneficial reduction was observed. Preferably, the curved surface structures of the invention are randomly placed and parallel to each other. This causes the ridges to be generally aligned in the same direction. It is preferred to have generally oriented ridgelines so that the film collimates more in one direction than the other which creates higher on-axis gain when used in a liquid crystal backlighting system. The curved surface structures are preferably randomized in such a way as to eliminate any interference with the pixel spacing of a liquid crystal display. This randomization can include the size, shape, position, depth, orientation, angle or density of the surface structures. This eliminates the need for diffuser layers to defeat Moiré and similar effects.

At least some of the surface structures may be arranged in groupings across the exit surface of the films, with at least some of the surface structures in each of the groupings having a different size or shape characteristic that collectively produce an average size or shape characteristic for each of the groupings that varies across the films to obtain average characteristic values beyond machining tolerances for any single optical element and to defeat Moiré and interference effects with the pixel spacing of a liquid crystal display. In addition, at least some of the surface structures may be oriented at different angles relative to each other for customizing the ability of the films to reorient/redirect light along two different axes. It is important to the gain performance of the films to avoid planar, un-faceted surface areas when randomizing features. Algorithms exist for pseudo-random placement of these features that avoid un-faceted or planar areas.

In one embodiment of the invention, the surface structures preferably have a cross section indicating a 90 degree included angle at the highest point of the feature. It has been shown that a 90-degree peak angle produces the highest on-axis brightness for the light redirecting film. The 90-degree angle has some latitude to it, it has been found that an angle of 88 to 92 degrees produces similar results and can be used with little to no loss in on-axis brightness. When the angle of the peak is less than 85 degrees or more than 95 degrees, the on-axis brightness for the light redirecting film decreases. Because the included angle is preferably 90 degrees and the width is preferably 15 to 30 micrometers, the curved wedge shaped features preferably have a maximum ridge height of the feature of between 7 and 30 micrometers. It has been shown that this range of heights of the wedge shaped elements provide high on-axis gain and Moiré reduction.

In another embodiment of the invention, the apex width preferably is greater than 90 and less than 130 degrees. It has been found that apex widths greater than 90 degrees and less than 130 degrees provide a softer-cut off than apex angles between 88 and 92 degrees.

The surface structures have an average pitch of between 10 and 55 micrometers. The average pitch is the average of the distance between the highest points of two adjacent features. The average pitch is different than the width of the features because the features vary in dimension and they are overlapping, intersecting, and randomly placed on the surface of the film to reduce Moiré and to ensure that there is no un-patterned area on the film. It is preferred to have less than 0.1% un-patterned area on the film, because un-patterned area does not have the same optical performance as the wedge shaped elements, leading to a decrease in performance.

In another preferred embodiment, the polymeric coating has a surface roughness ($R_a$) of between 0.7 and 4.0 micrometers. Surface roughness in the polymeric coating has been found to add a diffusive component to the transmitted light. The surface roughness has been found to hide small cosmetic defects, which could be objectionable to users of LCD devices. Roughness average less than 0.50 micrometer does not add sufficient roughness to achieve the desired result. Roughness average greater than 4.0 provides a high level of diffusion, resulting in a loss in on-axis gain for light redirecting surface structures. It is well understood that there is a relationship between surface $R_a$, the % surface area covered and the effect on on-axis brightness and viewing angle.

In a preferred embodiment of the invention, the adherent beads preferably have an index of refraction difference between the adherent beads and the polymer-structured surface of at least 0.05. By providing a refractive index difference of at least 0.05, the adherent beads can be visually observed for the purposes of visually determining coating uniformity, which is important in the manufacturing of the invention materials.

Preferred polymers for the formation of the surface structures include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly(vinyl acetal), and mixtures thereof. Copolymers of vinyl resins can also be utilized. Preferred polyesters of the invention include those produced from aromatic, aliphatic or cycloaliphatic dicarboxylic acids of 4-20 carbon atoms and aliphatic or alicyclic glycols having from 2-24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

In a preferred embodiment of the invention, the surface structure preferably comprises polysulfone. Polysulfone is a transparent polymer, has a relatively high index of refraction and has a relative high Tg, all of which makes polysulfone an ideal polymer for use in LCD devices like LCD TV or LCD monitors that routinely generate heat energy from backlight sources.

In another preferred embodiment, the surface structures preferably have a surface tension between 32 and 55 dynes/cm as measured by ASTM D133. A surface tension between 32 and 55 dynes/cm has been shown to provide good to excellent adhesion between the polymer coating and the surface structures. Below 30 dynes/cm$^2$, adhesion is difficult to achieve. Preferably the surface energy difference between the surface structures and the adherent beads is at least 5 dynes/cm$^2$. This difference is an important factor in allowing the polymer to form bead like structures on the surface of the structures prior to drying. If the surface structure surface energy we approximately the same as the adherent bead polymer, there would be a tendency for the bead polymer to form a film instead of the desired bead like formation.

The size, shape and the distribution of the surface structures are important in determining the distribution of light exiting the surface structures. Surface structures having an aspect ratio of between 0.5 and 6.0 are preferred. Surface structures with an aspect ratio less than 0.2 tend to have a small influence on increasing on-axis gain. Surface structures with an aspect ratio of greater than 6.0 are difficult to form utilizing melted polymer cast against patterned metallic roller, as the polymer tends to adhere to the surface of high aspect ratio features. Further, high pressure is required to fully form the high aspect ratio features significantly reducing tool life.

In one embodiment of the invention the surface structures have a repeating pattern. Repeating patterns generally provide low amounts of undesirable un-patterned area because repeating patterns have a relative high packing density compared to random surface structures. In another embodiment of the invention, the surface structures have a random pattern. While the random pattern does generally result in some un-patterned optical film because of the lower packing density compared to repeating patterns, a random pattern does generally result in lower levels of Moir& compared to repeating patterns. A random pattern has also been shown to hide or obscure small film defects from the viewer eye.

In another embodiment of the invention, the surface structures have a length, diameter or other dimension of at least 100 micrometers. A microstructure having a dimension greater than 100 micrometers provides the desired collimation for incident light required to provide an on-axis gain greater than 1.0. Further, microstructures that do not have a dimension greater than 100 micrometers are more difficult to manufacture and because of there size can result in unwanted un-patterned area on the optical film.

Light redirecting surface structures having an apex angle of approximately 90 degrees generally reject incident light at off axis angles and allow at or near on-axis to be transmitted. Typically, a plot of angle vs. luminance for a collimation macrostructure shows a peak luminance at or near 0 degree followed by a reduction in luminance as the angle approaches 90 degrees. The slope of the luminance reduction is a function of macrostructure geometry. It has been found that by providing a roughness on the surface of the surface structures that the change in slope can be dramatically altered to provide increased luminance over a wider range of angles.

FIG. 1 is a simplified schematic diagram of an apparatus for fabricating the optical film such as described in connection with FIGS. 2-5 and FIGS. 7-8. The apparatus includes an extruder 101, which extrudes a material 103. The apparatus also includes a patterned roller 105 that contains surface structures that forms the optical features in the optical layer 113. Additionally, the apparatus includes a pressure roller 107 that provides pressure to force material 103 into patterned roller 105 and stripping roller 111 that aids in the removal of material 103 from patterned roller 105.

In operation, a base layer 109 is forced between the pressure roller 107 and the patterned roller 105 with the extruded material 103. In an example embodiment, the base layer 109 is an oriented sheet of polymer. Moreover, the material 103 forms the optical layer 113, which includes optical features after passing between the patterned roller 105 and the pressure roller 107. Alternatively, an adhesion layer may be co-extruded with the material 103 at the extruder 101. Co-extrusion offers the benefit of two or more layers. The co-extruded adhesion layers can be selected to provide optimum adhesion to the base layer 109 and the optical layer 113 creating higher adhesion than a mono-layer. Accordingly, the co-extruded adhesion and optical layers are forced with the base layer between the pressure roller 107 and the patterned roller 105. After passing between the pressure roller 107 and the patterned roller 105, a layer 113 is passed along a roller 111.

In another preferred embodiment, the material 103 comprises a co-extruded layer of polymer having a skin layer that contacts the pattered roller 105 that has a melt index that is 50% greater than the remaining layers in the co-extruded structure. It has been found that a high flow skin layer aids in the replication fidelity of the polymer. The layers other than the skin layer may have a much lower melt index, resulting in a mechanically stiffer optical film that is better suited to withstand the rigors of display devices.

In a preferred embodiment, a light redirecting polymeric film is coated with a polymer coating using curtain coating, x-hopper coating or spray coating. Surface contact coating techniques such as gravure coating or roll coating have been found to apply the coating primarily to the apex areas of the light redirecting features. Preferably, the formation of the structures polymer film and the subsequent coating of the surface structures are accomplished on-line or sequentially to reduce manufacturing cost and reduce manufacturing defects associated with unwinding and winding of web materials.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, cameras, electronic games for which light weight, low power consumption and long operating life are important features. Additionally, LCD displays are useful for TVs, computer monitors, gaming displays, automotive displays, picture frames, appliance displays, point-of-purchase displays and the like.

In a preferred embodiment, the display comprises a LCD that typically would benefit from an improved viewing angle compared to display devices that have a narrow viewing angle. Preferred examples of a LCD devices that typically would benefit from a wide viewing angle includes TV, computer monitor, picture frame, public information displays, point of purchase displays and gaming displays. The wider viewing angle allows for even illumination through out a wider viewing angle compared to prior art collimated displays. In these displays, the film of the invention is located between the liquid crystal cell and the backlight source. The film spreads light into a wide cone allowing for even illumination. It is recognized that the viewing angle can be constrained by the liquid cell aperture geometry, compensation film technology and type of backlight source.

Active-matrix liquid crystal displays (LCD) use thin film transistors (TFT) as a switching device for driving each liquid crystal pixel. These LCD can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCD are normally black, that is, light transmission is inhibited in the off state when no voltage is applied. OMI displays reportedly have faster response times and a broader operational temperature range.

The optical film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and anti-ferroelectric liquid crystal mode, however, the invention is not restricted by the above combinations. In a liquid crystal display device, the oriented film of the present invention is necessary to be positioned in front of the backlight. The optical film of the present invention can even the lightness of a liquid crystal display device across the display because the film has excellent light-scattering properties to expand the light to give excellent visibility in all directions. Although the above effect can be achieved even by the single use of such film, plural number of films may be used in combination. The homogenizing film may be placed in front of the LCD material in a transmission mode to disburse the light and make it much more homogenous.

The present invention has a significant use as a light source destructuring device. In many applications, it is desirable to eliminate from the output of the light source itself the structure of the filament, which can be problematic in certain applications because light distributed across the sample will vary, and this is undesirable. Also, variances in the orientation of a light source filament or arc after a light source is replaced can generate erroneous and misleading readings. A homogenizing film of the present invention placed between the light source and the detector can eliminate from the output of the light source any trace of the filament structure and therefore causes a homogenized output which is identical from light source to light source.

The optical film may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

A reflection film can be formed by applying a reflection layer composed of a metallic film, etc., to the light exit surface of the optical film of the present invention and can be used e.g. as a retro-reflective member for a traffic sign. It can be used in a state applied to a car, a bicycle, person, etc.

The optical film of the present invention may also be to homogenize the output from laser diodes (LDs) or light emitting diodes (LED) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A optical film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The optical films of the present invention can also be used to homogeneously illuminate a sample under a microscope by de-structuring the filament or arc of the source, yielding a homogeneously illuminated field of view. The films may also be used to homogenize the various modes that propagate through a fiber, for example, the light output from a helical-mode fiber.

The optical films of the present invention also have significant architectural uses such as providing appropriate light for work and living spaces. In typical commercial applications, inexpensive transparent polymeric diffuser films are used to help diffuse light over the room. A homogenizer of the present invention, which replaces one of these conventional diffusers, provides a more uniform light output so that light is diffused to all angles across the room evenly and with no hot spots.

The optical films of the present invention may also be used to diffuse light illuminating artwork. The transparent polymeric film diffuser provides a suitable appropriately sized and directed aperture for depicting the artwork in a most desirable fashion.

Further, the optical film of the present invention can be used widely as a part for optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The optical film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the optical film is a rear projection screen, where it is generally desired to project the image from a light source onto a screen over a large area. The viewing angle for a television is typically smaller in the vertical direction than in the horizontal direction. The optical film acts to spread the light to increase viewing angle.

Embodiments of the invention may provide not only improved light diffusion and collimation but also an optical film of reduced thickness, that has reduced light absorption tendencies, that exhibits a soft angular cut-off, or that exhibits reduced Moiré or Newton rings in an LCD display system.

The invention also provides an scratch resistant surface, a diffusive surface that hides small cosmetic defects and a polymer layer that can be modified to provided a desired color point.

The invention has been described in detail with particular reference to certain preferred embodiments thereof, but it will be understood that variations and modifications can be effected within the spirit and scope of the invention.

The following examples illustrate the practice of this invention. They are not intended to be exhaustive of all possible variations of the invention. Parts and percentages are by weight unless otherwise indicated.

EXAMPLE

In this example a polycarbonate base sheet containing individual integral optical elements that were 1200 micrometers in length, 35 micrometers in width and 27 micrometers in height having an apex angle of approximately 90 degrees were coated with several discontinuous optical modification layers. Thirteen-inch wide micro replicated polycarbonate support manufactured by Eastman Kodak Company, Rochester, N.Y., were coated to produce the enhanced wide-angle appearance having a softer angular cut-off compared to the same optical elements without the optical modification layer. This example will demonstrate the advantaged optical properties of an optical modification layer.

To make the 1-kilogram dispersion of utilized for examples 1-4 that were coated onto the micro replicated polycarbonate support, 885.4 grams of distilled water and 114.6 grams of WitcoBond® W-320 Latex obtained from Chemtura Corporation, Middlebury Connecticut was added together. The WitcoBond® W-320 Latex is an aqueous polyurethane dispersion with a glass transition temperature of −15° C. and a 720% elongation at break. This total dispersion was kept at room temperature and allowed to stir for approximately one hour prior to coating.

To make the 1-kilogram dispersion utilized for examples 5-6 that were coated onto the micro replicated polycarbonate support, 935.4 grams of distilled water and 64.6 grams of WitcoBond® W-507 Latex obtained from Chemtura Corporation, Middlebury Connecticut was added together. The WitcoBond® W-507 Latex is an aqueous polyurethane dispersion with a glass transition temperature of −25° C. and a 800% elongation at break. This total dispersion was kept at room temperature and allowed to stir for approximately one hour prior to coating.

To make the 1-kilogram dispersion utilized for examples 7-8 that were coated onto the micro replicated polycarbonate support, 866.3 grams of distilled water and 133.7 grams of WitcoBond® W-232 Latex obtained from Chemtura Corporation, Middlebury Connecticut was added together. The WitcoBond® W-230 Latex is an aqueous polyurethane dispersion with a glass transition temperature of −15° C. and a 175% elongation at break. This total dispersion was kept at room temperature and allowed to stir for approximately one hour prior to coating.

The above latex dispersions were coated onto the polycarbonate replicated support containing the individual optical elements utilizing a slot coater and 20 meter horizontal drying section heated to 100 C. The examples 1-8 were coated at 10 meters/min. The coated and dried examples were then characterized for their optical performance using an EZ Contrast 160 ELDIM. On-axis optical gain loss, H/V (horizontal/vertical) off-axis gain improvements and maximum first derivative value were calculated from the horizontal and vertical scan curved generated by the ELDIM. Table 1 below contains the binder type, binder coverage and optical results and appearance.

1.30 minimum and the maximum first derivative in the 0 to 40V scan direction was 0.09 compared to a preferred 0.08 maximum.

TABLE 1

| Example | Binder Type | Binder Coverage [mg/m²] | On-axis Optical Gain Loss | H/V Off-axis Gain Improvement at 60 H/40 V degrees | Maximum First Derivative Value, H/V Scan Direction (0 to 60 H/0 to 40 V degrees) | Appearance |
|---|---|---|---|---|---|---|
| 1 | WitcoBond W-320 | 215 | 0.92 | 1.26/1.35 | 0.07/0.11 | Acceptable |
| 2 | WitcoBond W-320 | 430 | 0.91 | 1.34/1.54 | 0.05/0.08 | Acceptable |
| 3 | WitcoBond W-320 | 882 | 0.89 | 1.37/1.72 | 0.04/0.07 | Acceptable |
| 4 | WitcoBond W-320 | 1528 | 0.88 | 1.34/1.77 | 0.04/0.06 | Acceptable |
| 5 | WitcoBond W-507 | 430 | 0.96 | 1.20/1.43 | 0.10/0.13 | Acceptable |
| 6 | WitcoBond W-507 | 1528 | 0.93 | 1.26/1.56 | 0.06/0.09 | Acceptable |
| 7 | WitcoBond W-232 | 430 | NA | NA | NA | Unacceptable |
| 8 | WitcoBond W-232 | 1528 | NA | NA | NA | Unacceptable |

For the measurements in Table 1, the relative gain changes on-axis is the average (n=5) of the changes over +/−5 degrees theta (phi=0). The relative gain changes off-axis is the average (n=5) of the results over +/−1-degree theta, at +/−theta (e.g. @+60/−60 H, +40/−40V). The maximum first derivative (expressed as an absolute value) is the average (n=5) of the derivative at +/−theta.

The appearance shown in Table 1 was a visual determination of the coated layer as it was exiting the machine dryers. An acceptable grade indicated that some streaks or other common coating defects may be present but the overall appearance would be uniform enough to measure on-axis optical gain loss and off-axis optical gain improvement. An unacceptable grade indicates that the overall appearance is not acceptable due to streaks, mottle appearance or other coating defects. If the appearances grade is unacceptable, no luminance gain values were measured since the data would be distorted due to the non-uniform appearance. Further, the unacceptable appearance would result in undesirable non-uniformity in an LCD TV significantly reducing the commercial value of the optical film. Based on this criterion, the WitcoBond W-230 parts were not tested for on-axis optical gain loss and off-axis optical gain improvement.

Example 1 did not meet the desired optical performance characteristic because the off axis gain improvement at 60 degrees in the horizontal was 1.26 compared to a preferred 1.30 minimum. Examples 2-5 all meet the preferred targets for on axis optical gain loss, H/V off axis gain improvement and maximum first derivative value and sufficiently soften the angular cut-off point that is typical of light redirecting films. Example 5 did not meet the desired optical performance characteristics because the off axis gain improvement at 60 degrees in the horizontal was 1.20 compared to a preferred 1.30 minimum, the maximum first derivative in the 0 to 60 H scan direction was 0.10 compared to a preferred 0.06 maximum and the maximum first derivative in the 0 to 40V scan direction was 0.13 compared to a preferred 0.08 maximum. Example 6 did not meet the desired optical performance characteristics because the off axis gain improvement at 60 degrees in the horizontal was 1.26 compared to a preferred

PARTS LIST

| | |
|---|---|
| 101 | extruder |
| 103 | material |
| 105 | patterned roller |
| 107 | pressure roller |
| 109 | base layer |
| 111 | stripping roller |
| 113 | optical layer |
| 501 | gain curve for conventional prismatic film |
| 502 | gain curve for inventive material inventive |
| 503 | horizontal reference point (−60°) |
| 504 | conventional gain at 0° |
| 505 | vertical reference point (+40°) |
| 601 | first derivative of curve 501 (conventional) |
| 602 | first derivative of curve 502 (invention) |

The invention claimed is:

1. A display comprising a light source for providing fight and a light guide plate for outputting the light to a collimating light redirecting polymeric film, the collimating light redirecting polymeric film containing a structured surface on at least one side of the film and bearing a discontinuous population of adherent beads bonded to the structured surface.

2. The display of claim 1 wherein the adherent beads have a height of between 0.70 and 5.0 micrometers.

3. The display of claim 1 wherein the discontinuous population of adherent beads exhibits variable thickness over the surface of the structured surface.

4. The display of claim 1 wherein the structured surface comprises polycarbonate and the adherent beads comprise polyurethane.

5. The display of claim 1 wherein the discontinuous population of adherent beads is present on the structured surface in a pattern.

6. The display of claim 1 wherein the polymeric film has a structured surface on opposite sides of the film.

7. The display of claim 1 wherein adherent beads are irregular in shape.

8. The display of claim 1 wherein the adherent beads further comprise polymeric beads of a different refractive index immersed at least partially therein.

9. The display of claim 1 wherein the adherent beads have an index of refraction difference between the structured surface and the adherent beads between 0.02 and 0.5.

10. The display of claim 1 wherein the polymeric film has a light entry side and a light exit side.

11. The display of claim 1 wherein the adherent beads cover between 10 and 85% of the structured surface.

12. The display of claim 1 wherein the adherent beads are present in varying sizes.

13. The display of claim 1 wherein the structured surface comprises linear prismatic structures.

14. The display of claim 1 wherein the structured surface comprises individual elements having a ridgeline.

15. The display of claim 14 wherein the individual elements further comprise a valley area located between the ridgeline.

16. The display of claim 14 wherein the adherent beads are predominately located on the sides of the individual elements.

17. The display of claim 14 wherein the ridgeline is substantially free of adherent beads.

18. The display of claim 12 wherein the individual elements form an apex angle between 88 and 92 degrees, a height between 10 and 75 micrometers and a height to width aspect ratio of between 0.5 and 5.0.

19. The display of claim 14 wherein two opposing surfaces form the ridgeline and the adherent beads are present in a higher amount on one of the opposing surfaces.

20. The display of claim 1 wherein the structured surface comprises polysulfone.

21. The display of claim 1 wherein the adherent beads and the structured surface have a surface energy difference of at least 5 dynes/cm.

22. The display of claim 1 wherein the structured surface comprises cured acrylic.

23. The display of claim 1 wherein the structured surface comprises individual elements having a surface roughness of between 50 and 800 nanometers.

24. The display of claim 1 wherein the structured surface comprises individual elements having a ridgeline, a curved surface and a planner surface.

25. The display of claim 1 wherein the polymeric film has an on-axis optical gain loss between 0.85 and 0.95.

26. The display of claim 1 wherein the polymeric film has an on-axis optical gain loss greater than 0.80 and an off-axis gain improvement in the horizontal greater than 1.30.

27. The display of claim 1 wherein the polymeric film has an on-axis optical gain loss greater than 0.80, an off-axis gain improvement in the horizontal greater than 1.30 and a maximum first derivative in the horizontal less than 0.06.

28. The display of claim 1 wherein the polymeric film has an on-axis optical gain loss greater than 0.80, an off-axis gain improvement in the vertical greater than 1.30 and a maximum first derivative in the vertical less than 0.08.

29. The display of claim 1 wherein the polymeric film has an on-axis optical gain loss between 0.85 and 0.90, an off-axis gain improvement in the horizontal between 1.3 and 1.5, a maximum first derivative in the horizontal between 0.02 and 0.05 and a maximum first derivative in the vertical between 0.03 and 0.07.

* * * * *